United States Patent [19]

DiAngelo

[11] Patent Number: 5,977,969
[45] Date of Patent: Nov. 2, 1999

[54] UNIVERSAL RESOURCE LOCATOR DIALOG WITH EXTENDED TOP LEVEL DOMAINS

[75] Inventor: Michael Franz DiAngelo, Round Rock, Tex.

[73] Assignee: International Business Machines Corporation, Armonk, N.Y.

[21] Appl. No.: 08/963,470

[22] Filed: Nov. 3, 1997

[51] Int. Cl.[6] .................................................... G06F 3/00
[52] U.S. Cl. ......................... 345/339; 345/357; 345/354; 345/348; 345/336; 345/975; 707/507
[58] Field of Search .................................. 345/336, 338, 345/347, 348, 354, 357; 395/200.47, 200.49; 707/501, 505, 507, 534

[56] References Cited

U.S. PATENT DOCUMENTS

| | | | |
|---|---|---|---|
| 4,393,463 | 7/1983 | Aiken, Jr. ................................... | 707/542 |
| 5,625,781 | 4/1997 | Cline et al. ............................... | 345/335 |
| 5,751,980 | 5/1998 | Musashi et al. ......................... | 345/354 |
| 5,848,424 | 12/1998 | Scheinkman et al. .................. | 707/501 |
| 5,854,630 | 12/1998 | Nielsen ................................... | 345/352 |
| 5,867,161 | 2/1999 | Walsh ...................................... | 345/347 |
| 5,877,765 | 3/1999 | Dickman et al. ....................... | 345/357 X |
| 5,877,767 | 3/1999 | Yohanan ................................. | 345/357 |

FOREIGN PATENT DOCUMENTS

WO 96/31826  10/1996  WIPO .............................. G06F 13/00

Primary Examiner—Raymond J. Bayerl
Assistant Examiner—X. L. Bautista
Attorney, Agent, or Firm—Jeffrey S. LaBaw; Daniel E. Venglarik; Andrew J. Dillon

[57] ABSTRACT

A dialog for entry of uniform resource locators is provided with options, selected by actuation of a radio button, for entering blocks containing a resource identifier, a domain identifier, and a filename extension. The block text is visually distinguished from text entered by single characters from a physical or virtual keyboard. Once entered, the blocks are treated in a unitary manner for the purposes of deletion or substitution, with backspaces or deletes removing the entire block add selection of alternative options replacing the entire block. Character strings entered manually may be compared to the text blocks associated with the options provided and, when a match is identified, replaced with the block form to facilitate form checking of the composed uniform resource locator before returning it to the underlying application.

18 Claims, 9 Drawing Sheets

UNIVERSAL RESOURCE LOCATOR DIALOG WITH EXTENDED TOP LEVEL DOMAINS

BACKGROUND OF THE INVENTION

1. Technical Field

The present invention relates in general to applications utilizing uniform resource locators and in particular to dialog boxes within applications for entry of uniform resource locators. Still more particularly, the present invention relates to a mechanism within application dialog boxes reducing the potential for incorrect entry of uniform resource locators.

2. Description of the Related Art

Many applications currently utilized in connection with the Internet employ uniform resource locators (URLs) to identify files to be retrieved or otherwise manipulated. A uniform resource locator typically includes: a resource identifier, such as "HTTP://", "FTP://", or "GOPHER://"; a domain name identifying the system to be accessed utilizing the specified resource, such as "www.irs.gov" or "us.ibm.com"; and a directory path and filename identifying the file to be retrieved, executed, or otherwise manipulated.

Within user interfaces for an application, uniform resource locators are difficult to enter in dialog boxes. The component portions of a uniform resource locator appear esoteric and/or difficult to comprehend to novice users. Uniform resource locators include special characters such as colons, backslashes (/), and often tildes (~). Despite these difficulties, however, applications such a browsers which employ uniform resource locators may be extremely exacting. These applications require that uniform resource locators be entered correctly or an error will result, generally with little helpful corrective information provided by the application.

Due to their complexity and lack of intuitiveness, users frequently enter uniform resource locators incorrectly. The problem is exacerbated by the growing use of virtual keyboards, in which the keys are displayed within the user interface of, for example, a set-top box system. Virtual (or "soft") keyboards are difficult to use, slower, and more error prone than conventional keyboards. One problem in particular which arises from utilization of virtual keyboards is the number of views. Virtual keyboards typically require separate views for lower case letters, upper case letters, and special characters. The necessity of switching between views when entering a uniform resource locator contributes to the likelihood of errors and may be exasperating for the user.

As utilization of the Internet increases, uniform resource locators are similarly expanded. For example, seven additional top level domain names were recently added to the existing three: ".com", ".edu", and ".gov". The new domains include: ".org", ".net", ".store", ".firm", ".web", ".arts", and ".rec". Such expansions further complicate the problems associated with accurate entry of a uniform resource locator. As the number of top level domain names expands, users may find it difficult to recall which domain contains the Web site which they wish to contact.

It would be desirable, therefore, to provide a mechanism simplifying entry of uniform resource locators within applications and reducing the potential for incorrect entry of uniform resource locators. It would further be advantageous if the mechanism facilitated entry of the correct uniform resource locator by a user.

SUMMARY OF THE INVENTION

It is therefore one object of the present invention to improve applications utilizing uniform resource locators.

It is another object of the present invention to an improved dialog box for entry of uniform resource locators within applications.

It is yet another object of the present invention to providing a mechanism within application dialog boxes reducing the potential for incorrect entry of uniform resource locators.

The foregoing objects are achieved as is now described. A dialog for entry of uniform resource locators is provided with options, selected by actuation of a radio button, for entering blocks containing a resource identifier, a domain identifier, and a filename extension. The block text is visually distinguished from text entered by single characters from a physical or virtual keyboard. Once entered, the blocks are treated in a unitary manner for the purposes of deletion or substitution, with backspaces or deletes removing the entire block and selection of alternative options replacing the entire block. Character strings entered manually may be compared to the text blocks associated with the options provided and, when a match is identified, replaced with the block form to facilitate form checking of the composed uniform resource locator before returning it to the underlying application.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
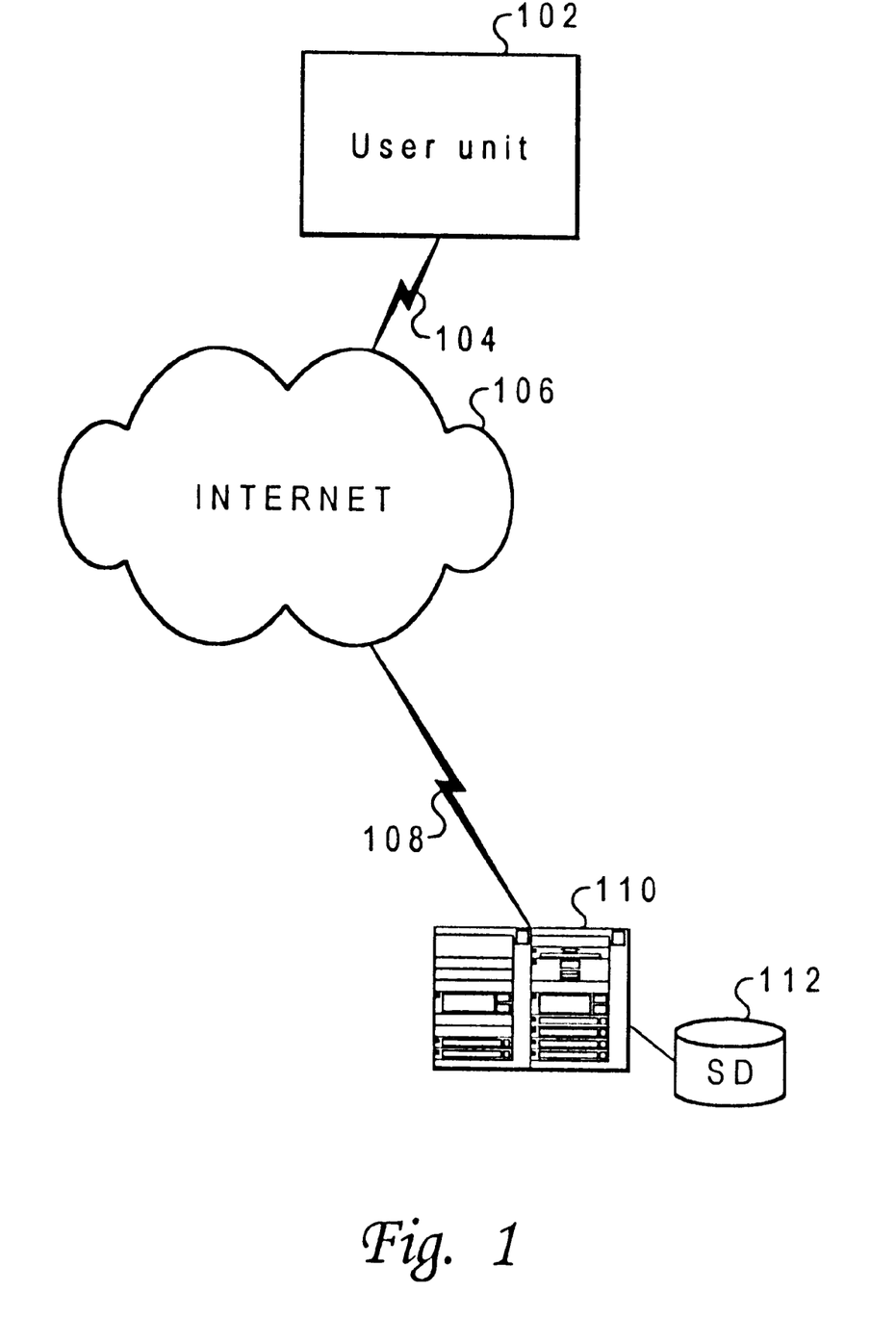
FIG. 1 depicts a network of data processing systems in which a preferred embodiment of the present invention may be implemented.

With reference now to the figures, and in particular with reference to FIG. 1, a network in which a preferred embodiment of the present invention may be implemented is depicted. The network includes a user unit 102 connected via communications link 104 to the Internet 106 and acting as an Internet client. Communications link 104 may, for example, be provided in the form of access service by an Internet Service Provider (ISP). Also connected to Internet 106 via communications link 108 is Internet server 110, which includes a storage device 112 such as a hard disk drive.

In the exemplary embodiment, Internet server 110 functions as a World Wide Web (WWW) server employing the HyperText Transmission Protocol (HTTP) to provide access to data formatted in the HyperText Markup Language (HTML) to Internet clients such as user unit 102. Such data—units of which are colloquially referred to as "Web pages"—may include text, graphics, and forms for querying databases. The data is identified by a Uniform Resource Locator (URL) specifying its location. The data may be passed via a series of servers within Internet 106 to user unit 102, and thus appropriate security measures should be provided.

Internet server 110 in the exemplary embodiment is employed to provide users with access to Web pages maintained on storage device 112, such as an informational Web site for an enterprise. Software operating on user unit 102 operates in accordance with the present invention to provide a mechanism facilitating entry of uniform resource locators and reducing the potential for erroneous entry.

Although an embodiment utilizing the Internet has been depicted for the purposes of describing the invention, those skilled in the art will recognize that the present invention may be employed in other types of networks, including intranets in which uniform resource locators are employed in conjunction with HTTP servers to provide access to searchable databases containing information relating to the operations of an enterprise maintaining the database.

Figure 2:
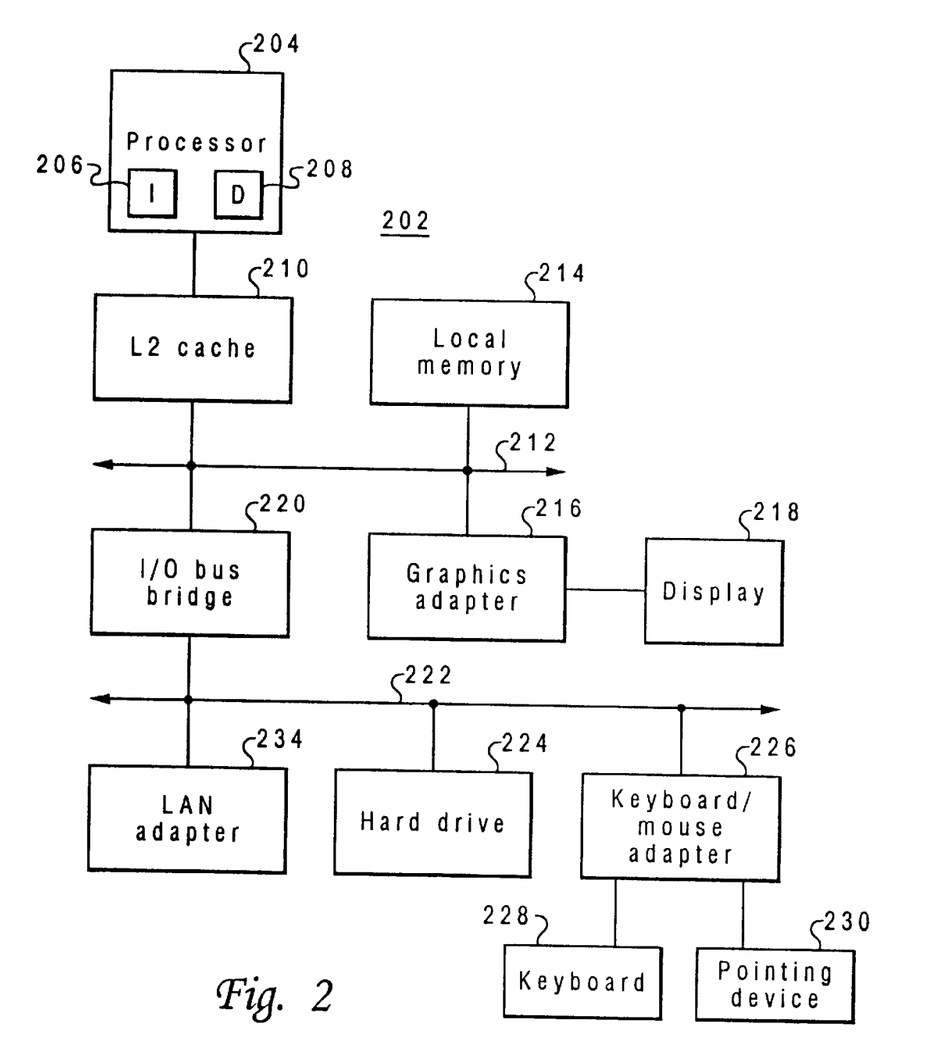
FIG. 2 is a data processing system in which a preferred embodiment of the present invention may be implemented.

Referring to FIG. 2, a data processing system in which a preferred embodiment of the present invention may be implemented is illustrated. Data processing system 202 may be employed as user unit 102 within the network depicted in FIG. 1, or as server 110. Modifications to the embodiment depicted may be appropriate depending on how data processing system 114 is utilized. Alternatively, data processing system 114 may be employed as a stand-alone unit in which the present invention may be implemented.

Data processing system 202 includes a processor 204 having internal level one instruction and data caches 206 and 208. Processor 204 is connected to a level two (L2) cache 210, which is connected via system bus 212 to system memory 214 and to bridge 220. Memory mapped devices, such as graphics adapter 216 connected to display unit 218, may also be connected to system bus 212.

Bridge 220 connects system bus 212 to input/output (I/O) bus 222. Various peripherals may be connected to I/O bus 222, such as hard disk drive 224. Keyboard/mouse adapter 226 connected to I/O bus 222 allows a keyboard 228 and pointing device 230 such as a mouse or trackball to be connected to data processing system 202. Network adapter 234 connected to I/O bus 222 allows data processing system 202 to be connected to a local area network (LAN) or the Internet.

The operation of data processing system 202 is well known to those skilled in the art. Furthermore, those in the art will recognize that the components depicted in the exemplary embodiment may be varied for purposes of specific applications. For example, additional peripheral devices such as a CD-ROM drive may be incorporated into data processing system 202. In accordance with a preferred embodiment of the present invention, data processing system 202 includes software providing uniform resource locator dialog boxes as described below.

With reference now to FIGS. 3A–3J, a uniform resource locator dialog box in accordance with a preferred embodiment of the present invention is depicted. In accordance with the known art, dialog box 302 may be displayed in the user interface of a data processing system when entry of a uniform resource locator is required by an application. Dialog box 302 includes entry box 304 for entry of a uniform resource locator. Insertion point 306, which is preferably a blinking indicator, within entry box 304 indicates the insertion point to the user.

Figure 3A:
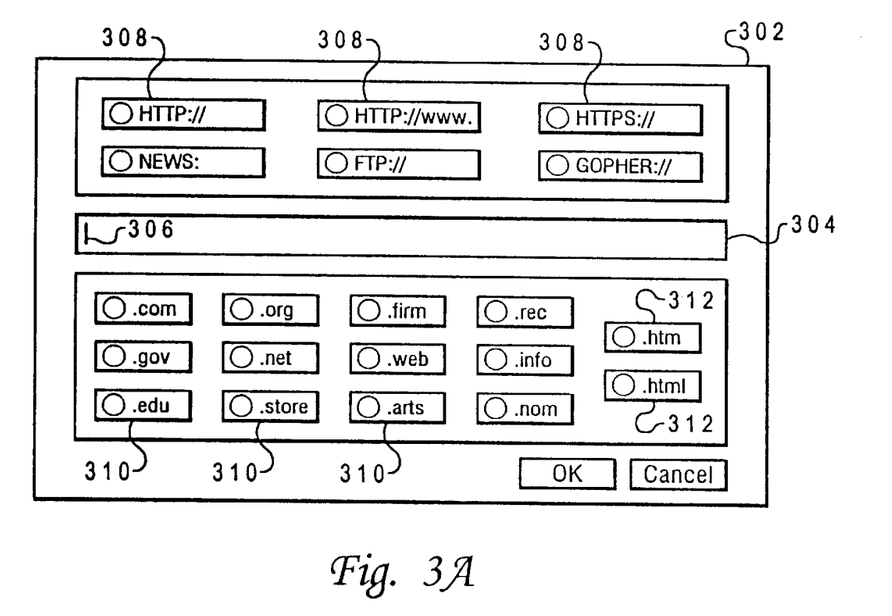
FIGS. 3A–3J depict a uniform resource locator dialog box in accordance with a preferred embodiment of the present invention.

Referring to FIG. 3A, dialog box 302 of the present invention also includes resource options 308, domain options 310, and file options 312. In the exemplary embodiment, these options may be selected by radio buttons similar to those employed in the prior art. Alternatively, boxes or other methods of selecting an option within dialog box 302 may be employed. Resource options 308, domain options 310, and file options 312 provide the user with blocks for the uniform resource locator entered into entry box 304.

Figure 3B:
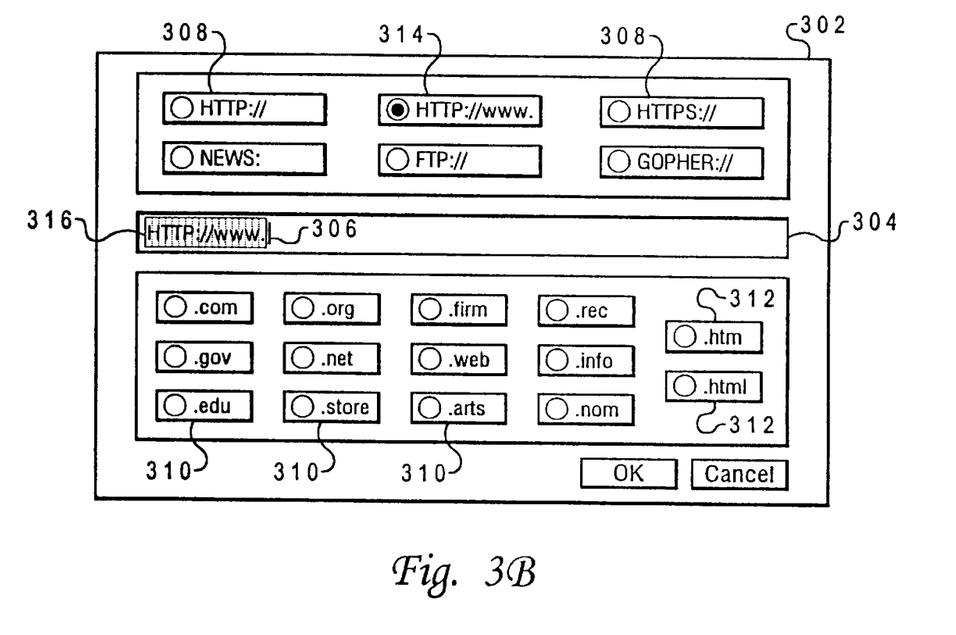

Referring to FIG. 3B, resource options 308 allow the user to select a particular resource to be utilized, with the appropriate resource identifier being automatically entered into the uniform resource locator formed within entry box 304. Selection of a particular resource option 314, for example, results in the appropriate, corresponding resource identifier 316 being entered in entry box 304. The radio button for the resource option 314 selected by the user is altered to provide a visual cue reflecting the user's selection. Resource identifier 316 is entered in entry box 304 as a block and will subsequently be treated as a block (e.g., deleted or replaced as a block). A visual indicator such as highlighting may be provided to indicate that resource identifier 316 was entered as a result of selection of resource option 314. Insertion point 306 is moved to the end of resource identifier 316 to indicate the new insertion point.

Figure 3C:
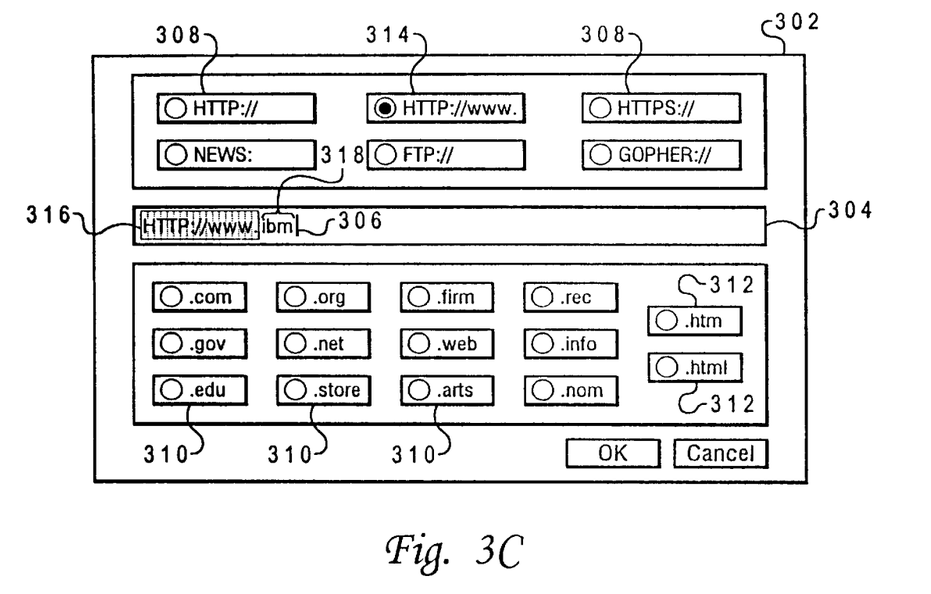

Referring to FIG. 3C, a user's subsequent entry of characters 318 from the keyboard or virtual keyboard is reflected within entry box 304. Each character is displayed within entry box 304 as it is displayed, with insertion point 306 being moved to a point following the last entered character to reflect the new insertion point.

Figure 3D:
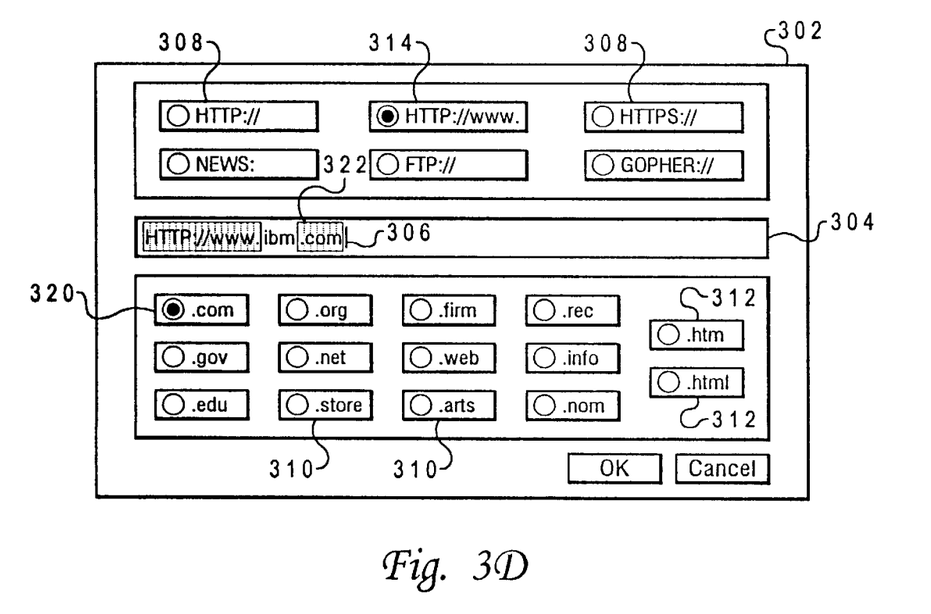

Referring to FIG. 3D, a user may select a particular domain option 320 to add a top level domain identifier 322 to the uniform resource locator being formed within entry box 304. As with the resource option, the radio button associated with the selected domain option 320 is altered to provide an indication of the user's selection, domain identifier 322 is entered within entry box 304 as a block with visual indication of the manner of selection, and insertion point 306 moves to reflect the new insertion point. The domain options 310 in the exemplary embodiment include options, and corresponding identifiers, for all top-level domains including the extended domains recently added (".org", ".net", ".firm", etc.). Since applications usually search for the filename "default" or "index" in the absence of a specified filename, the uniform resource locator depicted in FIG. 3D is sufficiently formed to be utilized.

Figure 3E:
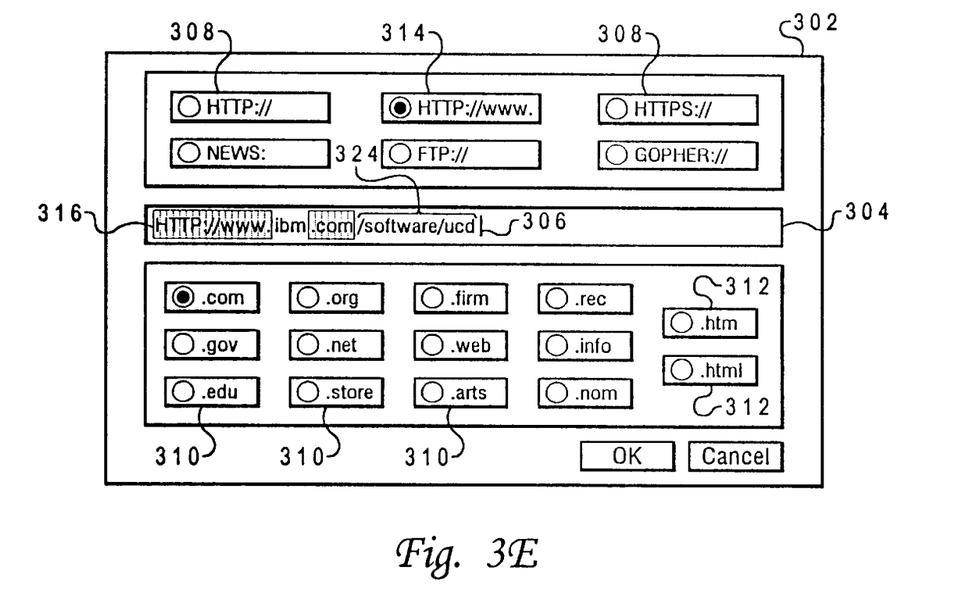
Figure 3F:
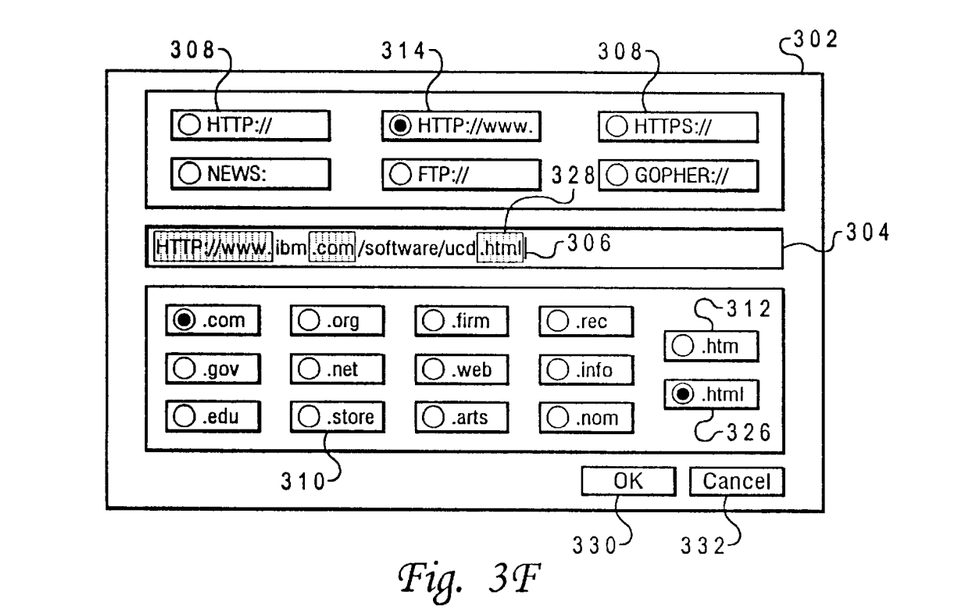

Referring to FIG. 3E, if a user desires to specify a directory path and filename, characters 324 may be entered using the keyboard or virtual keyboard of the data processing system. As shown in FIG. 3F, a filename option 326 may be selected by the user to enter a corresponding filename extension 328 within entry box 304 at the insertion point. The visual appearance of the radio button associated with the selected filename option 326 is altered, the desired filename extension 328 is entered as a block, and insertion point 306 is moved to the new insertion point.

Dialog box 302 also includes an actuator button 330 and an escape button 332. Actuator button 330 causes the form of the uniform resource locator composed within entry box 304 to be checked. If the form is appropriate—i.e. the uniform resource locator includes at least a resource identifier and a domain identifier without any missing required characters, illegal characters, or illegal character combinations—the composed uniform resource locator is returned to the application which opened dialog box 302 and dialog box 302 is closed. Actuator button 330 may be a default option selected upon entry of an "Enter" or "Return" character, and may include a visual indicator of such status as a default option. Cancel button 332 closes dialog box 302 without returning a uniform resource locator to the calling application. An additional button (not shown), which may also be selected by pressing the escape ("Esc") key, may be provided to delete the contents of entry box 304 and restore the appearance of all radio buttons to an "unselected" condition without closing dialog box 302.

Figure 3G:
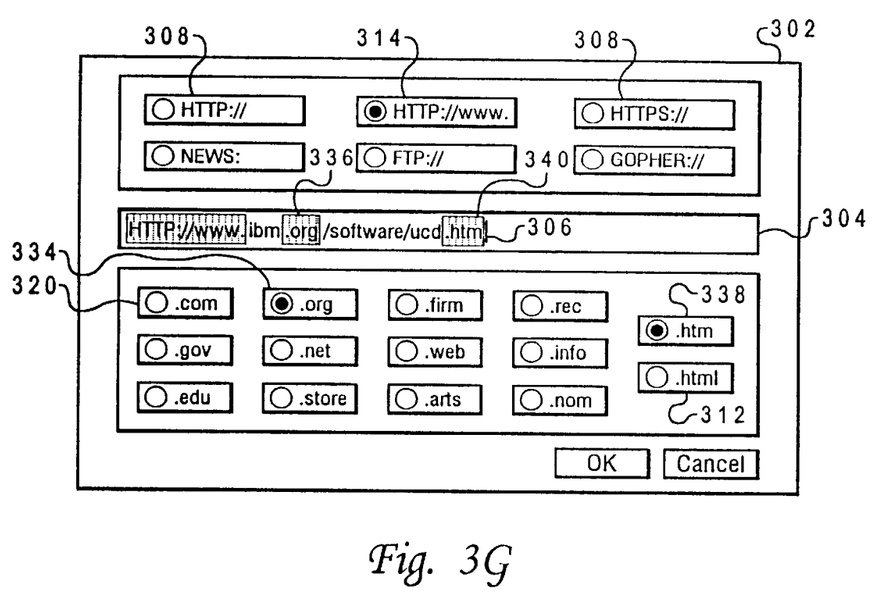

Referring to FIG. 3G, when an option is selected by a user, selection of a different option by the user automatically replaces the previously selected option. For example, selection of a different domain option 334 replaces the previous domain identifier in entry box 304 with a new domain identifier 336. The appearance of the radio button associated with the previously selected domain option 320 is returned to the "unselected" condition, while the radio button associated with the newly selected domain option 334 is altered to reflect the selection. Similarly, selection of a new filename option 338 results in replacement of the previous filename extension within entry box 304 with a new filename extension 340 corresponding to the newly selected filename option 338, together with the attendant alteration of radio button appearance for the previously and currently selected options. Although not depicted, the resource identifier may be replaced in the same manner by selecting a different resource option.

Figure 3H:
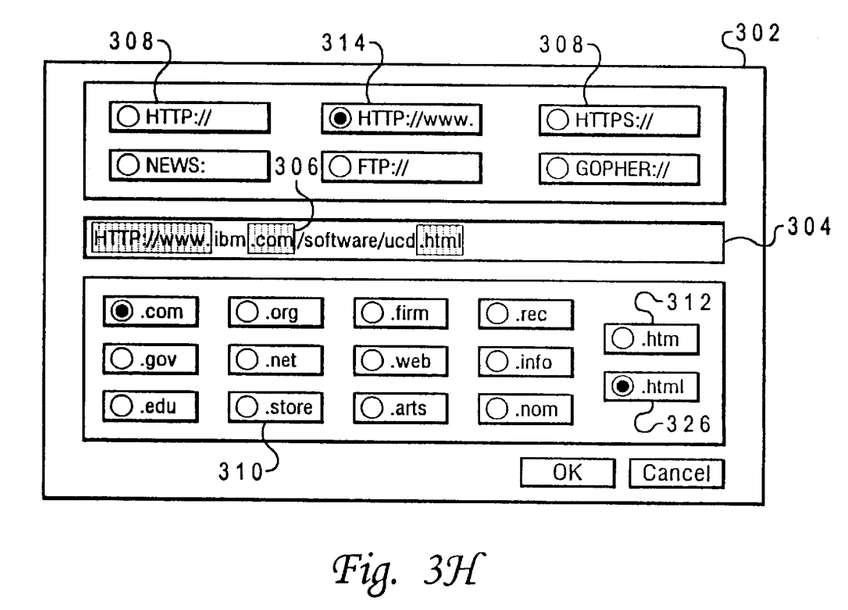

Referring to FIG. 3H, insertion point 306 may be moved anywhere within the composed uniform resource locator in entry box 304 to alter the insertion point by moving the pointer and clicking on the desired location. Insertion point 306 may not be placed within a block containing a resource identifier derived from selection of a resource option, a domain identifier derived from selection of a domain option, or a filename extension derived from selection of a filename option, but may be placed immediately before or immediately after such blocks. In the manner, the blocks corresponding to selected options are treated as discrete units, like single characters entered from a keyboard.

Figure 3I:
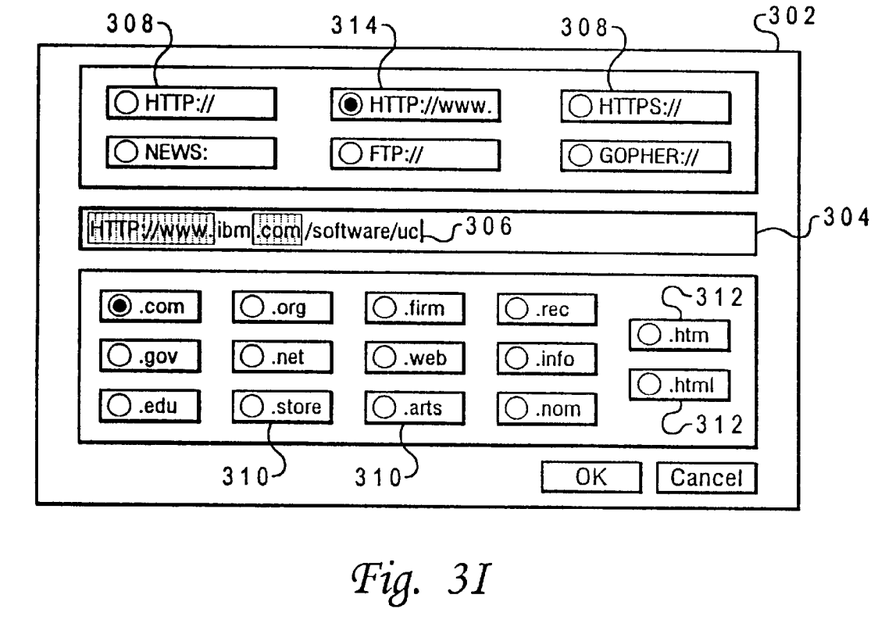
Figure 3J:
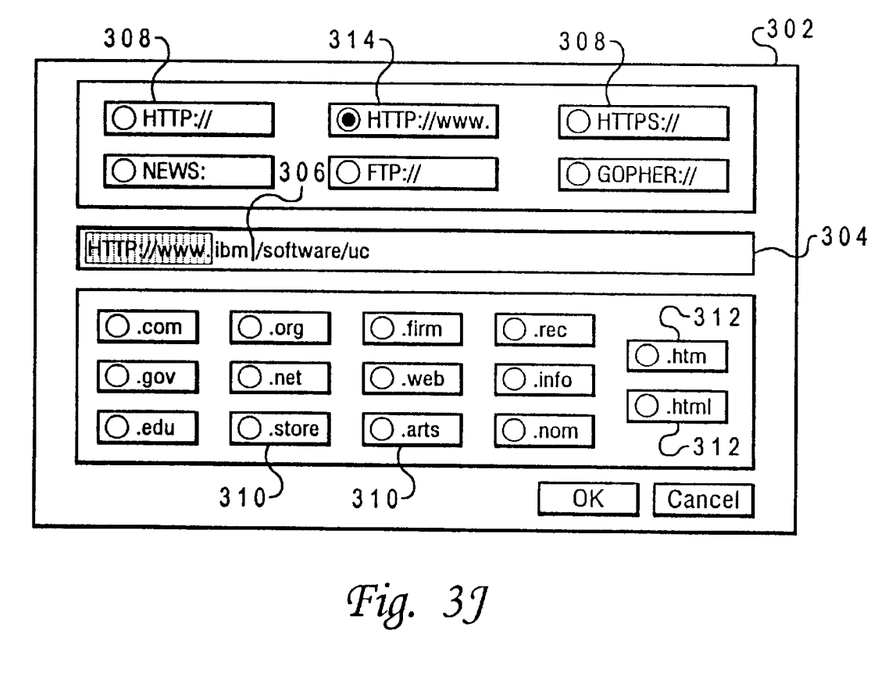

Referring to FIGS. 3I and 3J, as described above the blocks containing identifiers derived from selection of an option are deleted as blocks, while characters entered via the keyboard are deleted individually. This behavior applies to both deletions using the "Backspace" key on a keyboard, as illustrated in FIG. 3I, and deletions using the "Delete" key, as illustrated in FIG. 3J.

Figure 4A:
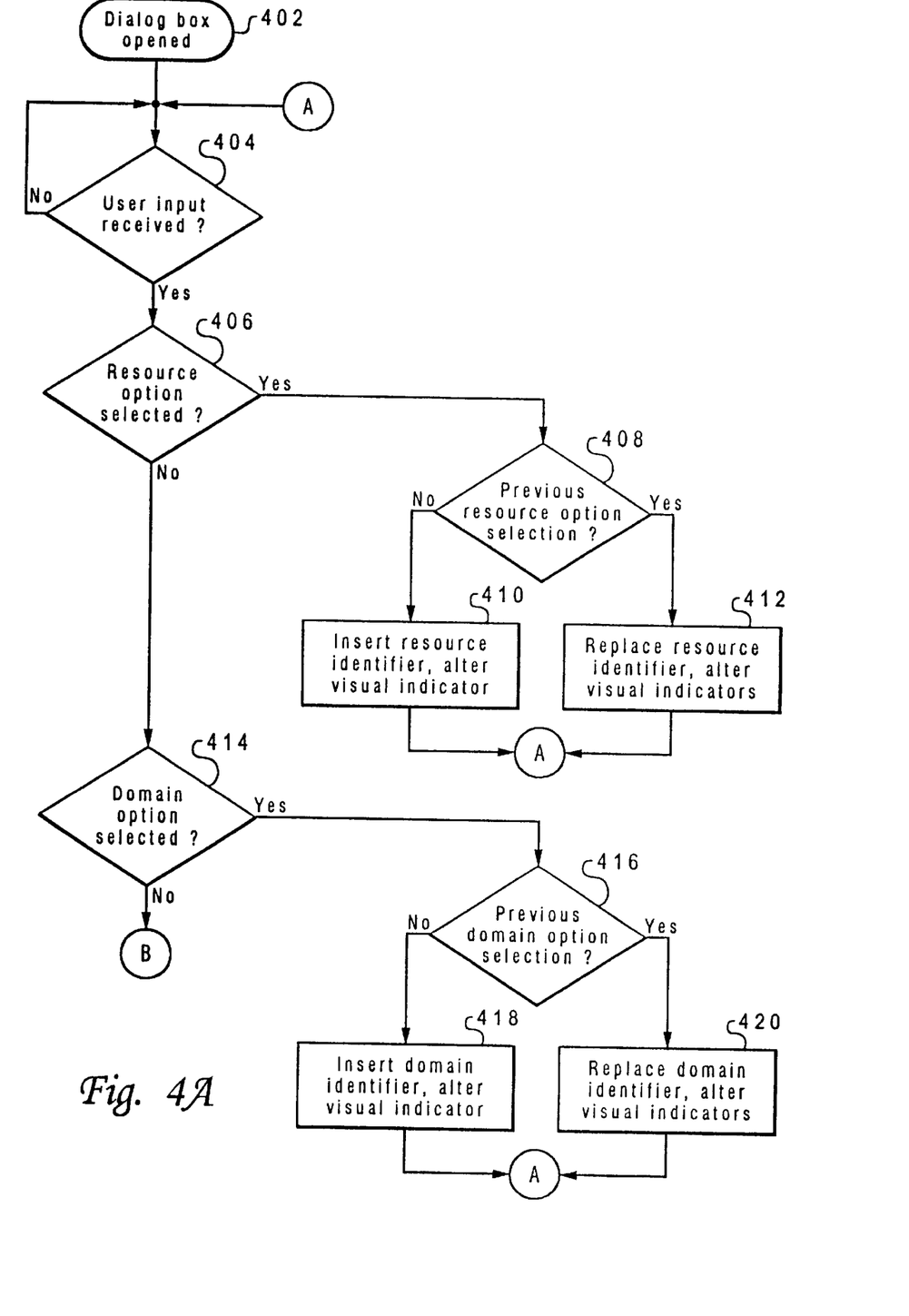
FIG. 4A–4B is a high level flowchart for a basic process of composing a uniform resource locator in a dialog box in accordance with a preferred embodiment of the present invention.
Figures 4B, 5:
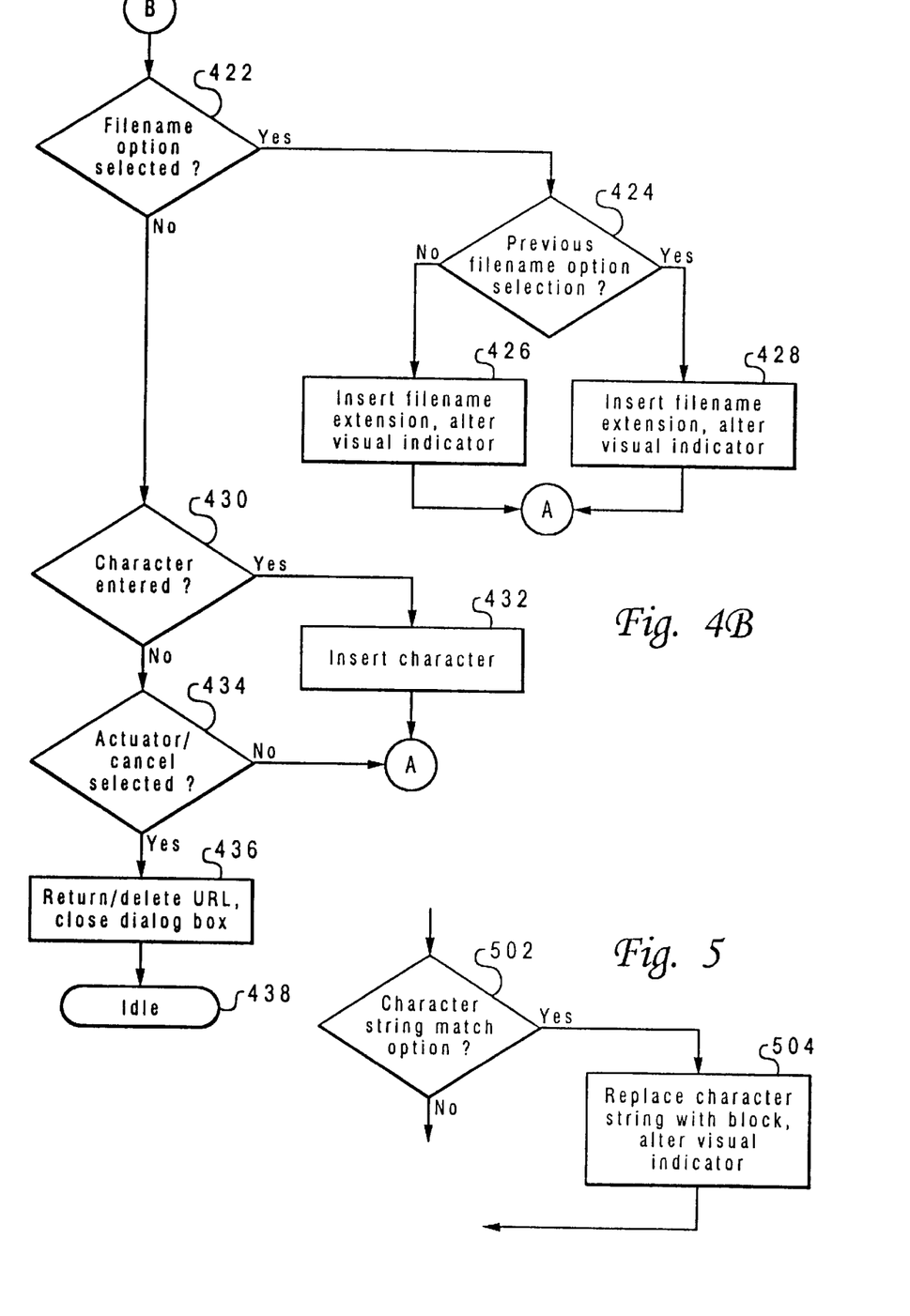
FIG. 5 depicts a high level flowchart for a portion of an extension of the process for composing a uniform resource locator in accordance with a preferred embodiment of the present invention.

Referring to FIG. 4A–4B, a high level flowchart for a basic process of composing a uniform resource locator in a dialog box in accordance with a preferred embodiment of the present invention is illustrated. The process begins at step 402, which depicts a dialog box being opened by an application for composition of a uniform resource locator. The process then passes to step 404, which illustrates a determination of whether user input has been received. If not, the process loops back to step 404 to await user input. If so, however, the process proceeds to step 406, which depicts a determination of whether the user selected a resource option.

If the user has selected a resource option, such as by clicking on a radio button associated with a desired resource, the process proceeds to step 408, which illustrates a determination of whether a previous resource option selection had been made. If not, the process proceeds to step 410, which depicts inserting the resource identifier associated with the selected resource option in the uniform resource locator being composed and altering the visual indicator (e.g., radio button) associated with the selected resource option. If a resource option had been previously selected, the process proceeds instead to step 412, which illustrates replacing the resource identifier with the resource identifier for the currently selected option and altering the visual indicators associated with the previously selected and currently selected resource option.

Referring again to step 406, if the user did not select a resource option, the process proceeds instead to step 414, which depicts a determination of whether a domain option was selected. If a domain option selection was made, the process proceeds to step 416, which illustrates a determination of whether a domain option had been previously selected. If a previous domain option selection had not been made, the process proceeds to step 418, which depicts inserting the corresponding domain identifier and altering the visual indicator associated with the selected domain option. If a previous selection of a domain option had been made, however, the process proceeds instead to step 420, which illustrates replacing the prior domain identifier with the domain identifier associated with the currently selected domain option, and altering the visual appearance of indicators associated with the previously selected and currently selected domain options.

Referring once again to step 414, if the user did not select a domain option, the process proceeds instead to step 422 depicted in FIGS. 4B, which depicts a determination of whether a filename option was selected by the detected user input. If a filename option selection was made, the process proceeds to step 424, which illustrates a determination of whether a filename option had been previously selected. If a previous filename option selection had not been made, the process proceeds to step 426, which depicts inserting the corresponding filename extension and altering the visual indicator associated with the selected filename option. If a previous selection of a filename option had been made, however, the process proceeds instead to step 428, which illustrates replacing the prior filename extension with the filename extension associated with the currently selected filename option, and altering the visual appearance of indicators associated with the previously selected and currently selected filename options.

Referring to step 422, if the user input detected was not a selection of a filename option, the process proceeds to step 430, which illustrates a determination of whether a character has been entered on the keyboard. If so, the process proceeds to step 432, which depicts inserting the entered character in the uniform resource locator being composed. If not, however, the process passes to step 434, which illustrates a determination of whether the actuator or cancel buttons had been selected (or the respectively associated enter or escape keys pressed). In the depicted example, for all instances in which the user input detected was not selection of the actuator or escape control, the process returns to step 404 depicted in FIG. 4A to await further user input.

If either the actuator or cancel options were selected, the process passes to step 436, which depicts returning the composed uniform resource locator to the underlying application calling the mechanism of the present invention, or deleting the composed uniform resource locator, as appropriate, and closing the dialog box. The process then passes to step 438, which illustrates the process becoming idle until a uniform resource locator must again be composed for an application such as a browser.

With reference now to FIG. 5, a high level flowchart is depicted for a portion of an extension of the process for composing a uniform resource locator in accordance with a preferred embodiment of the present invention. The process portion depicted may be used in connection with receiving user input for composing the uniform resource locator, and begins at step 502, which depicts a determination of whether a character string entered by a user matches the resource identifier, domain identifier, or filename extension associated with one of the available resource, domain, or filename options. If so, the process passes to step 504, which illustrates replacing the matching character string with a block containing the respective resource identifier, domain identifier, or filename extension, and altering the visual indicator (radio button, etc.) of the corresponding resource option, domain option, or filename option. The process portion depicted thus checks the uniform resource locator being composed for character strings coinciding with the block text of a resource, domain, or filename option. This process may be useful in checking the form of a composed uniform resource locator to determine, for example, whether it includes at least a proper resource identifier and a proper domain identifier. No determination of whether the composed uniform resource locator "points" to an actual Web page, such as by checking the composed uniform resource locator against an index of known URLs, need be made to benefit from the form checking aspect of the present invention; rather, the composed uniform resource locator is checked for components matching the options provided.

The present invention may be utilized with any application requiring entry of a uniform resource locator to ensure that a proper, accurate, and complete uniform resource locator is composed and presented to the application. Correct entry of a uniform resource locator is both simplified and facilitated, and the potential for errors due to improperly entered uniform resource locators are thereby reduced. The recently adopted extended top-level domains are supported by the present invention.

The present invention has a number of advantages over existing methods of providing user input boxes for entering uniform resource locators. First, all high level domain names are listed. Since recognition is easier than recall, users are more likely to enter the correct domain name. As the number of domain names expands, this feature becomes increasing important since memory retention for a large number of different domain names may be difficult, particularly for unsophisticated users. Second, all common elements of a uniform resource locator are displayed as selectable options to a user, which both reinforces learning of these elements by the user and reduces the potential for spelling errors. Moreover, these common elements are all available to the user in a single keystroke, not four or more keystrokes, and may be readily changed if wrong. For example, if a users tries ".com" and receives an error message, with a single keystroke the domain may be changed to ".firm" and the new uniform resource locator tried.

The present invention also enjoys advantages over virtual keyboards in that the large number of views is not required. Soft keyboards might dedicate a key within a particular view to a uniform resource locator component—the domain name ".com", for example, However, this would require an additional view (a fourth or even fifth view if the extended top level domains were displayed), with the attendant difficulty of switching between views during typing.

The present invention also does not suffer from the disadvantages seen in prior art "combo boxes". Combo boxes are user entry fields with a down pointing arrow at the end. When the arrow is actuated by a user, a list of potential selections drops down below the combo box, usually containing a list of most recently used entries. This only allows complete uniform resource locators to be selected, and may be limited to those which have been employed in the past. Users are not generally given control over items within the list. Furthermore, the list obscures at list a portion of the viewable display area when dropped down, and is not always present.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of facilitating correct entry of a uniform resource locator, comprising:

providing a dialog box including a plurality of options for portions of a uniform resource locator; and responsive to a user selecting one of the plurality of options, inserting a corresponding portion of a uniform resource locator as a block within an entry box, the insertion further comprising:

responsive to a user selecting a resource option, inserting a resource identifier in the entry box;

responsive to a user selecting a domain option, inserting a domain identifier in the entry box; and responsive to a user selecting a filename option, inserting a filename extension in the entry box.

2. The method of claim 1, wherein the step of providing a dialog box including a plurality of options for portions of a uniform resource locator further comprises:

providing a plurality of resource options, domain options and filename options.

3. The method of claim 1, wherein the step of inserting a corresponding portion of a uniform resource locator as a block within an entry box further comprises:

inserting the corresponding portion of a uniform resource locator at a current insertion point.

4. The method of claim 1, wherein the step of inserting a corresponding portion of a uniform resource locator as a block within an entry box further comprises:

determining whether the entry box contains a block entry of a type including the corresponding portion of a uniform resource locator; and replacing the block entry with the corresponding portion of a uniform resource locator.

5. The method of claim 1, wherein the step of inserting a corresponding portion of a uniform resource locator as a block within an entry box further comprises:

providing a visual indicator of the block within the entry box.

6. The method of claim 1, further comprising:

responsive to a user pressing key for deleting text in a selected direction within the entry box while a block containing the corresponding portion of a uniform resource locator is adjacent to an insertion point in the selected direction, deleting the block.

7. The method of claim 1, further comprising:

responsive to a user actuating a control to returning a composed uniform resource locator in the entry box to an application, checking a form of the composed uniform resource locator.

8. A data processing system assisting a user in correctly entering a uniform resource locator, comprising:

a dialog box on a display within the data processing system, the dialog box including a plurality of user-selectable resource options, domain options, and filename options;

means, responsive to a user selecting a resource option, for inserting a corresponding resource identifier as a block in a uniform resource locator being composed within an entry box;

means, responsive to a user selecting a domain option, for inserting a corresponding domain identifier as a block in the uniform resource locator being composed; and means, responsive to a user selecting a filename option, for inserting a corresponding filename extension as a block in the uniform resource locator being composed.

9. The data processing system of claim 8 wherein the plurality of user-selectable resource options, domain options, and filename options each further comprise:

a radio button which changes visual appearance when a user selects a previously unselected, corresponding option within the plurality of resource options, domain options, and filename options.

10. The data processing system of claim 8, further comprising:

a blinking insertion point indicator within the entry box indicating a current insertion point within the uniform resource locator being composed.

11. The data processing system of claim 8, further comprising:

means, responsive to a user selecting a new resource option while a previous resource option was selected, for replacing a block within the uniform resource locator being composed containing a resource identifier corresponding to the previously selected resource option with a resource identifier corresponding to the new resource option;

means, responsive to a user selecting a new domain option while a previous domain option was selected, for replacing a block within the uniform resource locator being composed containing a domain identifier corresponding to the previously selected domain option with a domain identifier corresponding to the new domain option; and means, responsive to a user selecting a new filename option while a previous filename option was selected, for replacing a block within the uniform resource locator being composed containing a filename extension corresponding to the previously selected filename option with a filename extension corresponding to the new filename option.

12. The data processing system of claim 8, further comprising:

means, responsive to a user entering text within the entry box coinciding with a resource identifier corresponding to a resource option, for replacing the text with a block containing the resource identifier and for providing a visual indication that the resource option is selected;

means, responsive to a user entering text within the entry box coinciding with a domain identifier corresponding to a domain option, for replacing the text with a block containing the domain identifier and for providing a visual indication that the domain option is selected; and means, responsive to a user entering text within the entry box coinciding with a filename extension corresponding to a filename option, for replacing the text with a block containing the filename extension and for providing a visual indication that the filename option is selected.

13. The data processing system of claim 8, further comprising:

a user control within the dialog box for initiating return of a composed uniform resource locator within the entry box to an application; and means, responsive to a user actuating the user control, for checking a form of the composed uniform resource locator.

14. A computer program product in a computer usable medium, comprising:

first instructions in the computer usable medium for providing a dialog box including a plurality of options for portions of a uniform resource locator; and second instructions in the computer usable medium, responsive to a user selecting one of the plurality of options, for inserting a corresponding portion of a uniform resource locator as a block within an entry box, the insertion further comprising:
responsive to a user selecting a resource option, inserting a resource identifier in the entry box;
responsive to a user selecting a domain option, inserting a domain identifier in the entry box; and
responsive to a user selecting a filename option, inserting a filename extension in the entry box.

15. The computer program product of claim 14, wherein the instructions for providing a dialog box including a plurality of options for portions of a uniform resource locator further comprise:

instructions for providing a plurality of resource options, domain options and filename options.

16. The computer program product of claim 14, wherein the instructions for inserting a corresponding portion of a uniform resource locator as a block within an entry box further comprise:

instructions for inserting the corresponding portion of a uniform resource locator at a current insertion point.

17. The computer program product of claim 14, wherein the instructions for inserting a corresponding portion of a uniform resource locator as a block within an entry box further comprise:

instructions for determining whether the entry box contains a block entry of a type including the corresponding portion of a uniform resource locator; and instructions for replacing the block entry with the corresponding portion of a uniform resource locator.

18. The computer program product of claim 14, wherein the instructions for inserting a corresponding portion of a uniform resource locator as a block within an entry box further comprises:

instructions for providing a visual indicator of the block within the entry box.

* * * * *